United States Patent
Sasaki et al.

(10) Patent No.: US 7,755,908 B2
(45) Date of Patent: Jul. 13, 2010

(54) ELECTRIC CONNECTION BOX

(75) Inventors: Yoshikazu Sasaki, Yokkaichi (JP); Yukinori Kita, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

(*) Notice: Subject to any disclaimer, the term of this patent is extended or adjusted under 35 U.S.C. 154(b) by 647 days.

(21) Appl. No.: 11/793,327

(22) PCT Filed: Apr. 17, 2006

(86) PCT No.: PCT/JP2006/308063

§ 371 (c)(1), (2), (4) Date: Jun. 19, 2007

(87) PCT Pub. No.: WO2006/115101

PCT Pub. Date: Nov. 2, 2006

(65) Prior Publication Data
US 2008/0137267 A1    Jun. 12, 2008

(30) Foreign Application Priority Data
Apr. 21, 2005    (JP) .............................. 2005-124014

(51) Int. Cl.
H05K 5/02    (2006.01)
(52) U.S. Cl. ...................... 361/752; 361/601; 361/622; 174/520; 439/76.2
(58) Field of Classification Search ................. 361/728, 361/730, 752, 601, 605, 611, 622; 174/520; 439/76.1, 76.2
See application file for complete search history.

(56) References Cited

U.S. PATENT DOCUMENTS

| 6,116,916 | A  | * | 9/2000 | Kasai        | 439/76.2 |
| 6,220,875 | B1 | * | 4/2001 | Kawakita     | 439/76.2 |
| 6,430,054 | B1 | * | 8/2002 | Iwata        | 361/752  |
| 6,600,658 | B2 | * | 7/2003 | Iwata        | 361/752  |
| 6,602,079 | B2 | * | 8/2003 | Chiriku et al.| 439/76.2 |

(Continued)

FOREIGN PATENT DOCUMENTS

| DE | 103 29 650 A1 | 1/2004 |
| JP | A-10-035375   | 2/1998 |
| JP | A-2003-037913 | 2/2003 |

(Continued)

*Primary Examiner*—Dameon E Levi
(74) *Attorney, Agent, or Firm*—Oliff & Berridge, PLC

(57) ABSTRACT

A circuit constituent 10 comprises a circuit board 11 on which a switching member 13 is implemented and a bus bar 12 wired along the circuit board 11, and a case 20 is provided with a frame 21 arranged on the circuit board 11 and fixed along its peripheral edge and a cover 24 assembled to the frame 21 so as to cover the circuit board 11. A plurality of first terminal portions 14 constructed by bending the ends of the bus bar 12 substantially in the L shape are arranged side by side along the frame 21, and a falling restriction portion 36 provided at a front edge portion 24F of the cover 24 restricts falling deformation of the first terminal portion 14. By locking displacement restricting portions 30, 37 provided at the outer edge portions of the frame 21 and the cover 24 with each other, displacement of the cover 24 in the direction separated from the first terminal portion 14 with respect to the frame 21 is restricted, and falling deformation of the first terminal portion 14 can be surely prevented.

13 Claims, 8 Drawing Sheets

U.S. PATENT DOCUMENTS

| | | | |
|---|---|---|---|
| 7,167,377 B2 * | 1/2007 | Onizuka et al. | 361/775 |
| 7,203,073 B2 * | 4/2007 | Kawakita et al. | 361/775 |
| 7,351,911 B2 * | 4/2008 | Chiriku et al. | 174/59 |
| 7,357,650 B2 * | 4/2008 | Sasaki et al. | 439/76.2 |
| 7,364,438 B2 * | 4/2008 | Sasaki et al. | 439/76.1 |
| 7,514,629 B2 * | 4/2009 | Sasaki et al. | 174/50 |
| 7,532,458 B2 * | 5/2009 | Sasaki et al. | 361/622 |
| 2003/0137813 A1 | 7/2003 | Onizuka et al. | |
| 2004/0001319 A1 | 1/2004 | Kawakita et al. | |

FOREIGN PATENT DOCUMENTS

| | | |
|---|---|---|
| JP | A-2003-164039 | 6/2003 |
| JP | A-2003-224918 | 8/2003 |
| JP | A-2004-040873 | 2/2004 |

* cited by examiner

ELECTRIC CONNECTION BOX

TECHNICAL FIELD

The present invention relates to an electric connection box.

BACKGROUND ART

As an electric connection box mounted on an automobile, there is a structure accommodating a circuit constituent in a case. The circuit constituent comprises a circuit board, a bus bar wired along the back face of the circuit board and a switching member such as a relay implemented on the front face side of the circuit board, and a terminal portion is formed on the bus bar by bending its end substantially in the L shape. The case comprises a frame arranged on the circuit board and fixed along its peripheral edge and a cover assembled on the frame covering the circuit board. The terminal portions of the bus bar are bent substantially in the L shape and are substantially arranged in one line with each other between the frame and the cover and projected to the outside of the case.

In this type of electric connection box, when the other connector is to be fitted with the terminal portion from its tip end side, there is a concern that the terminal portion might be deformed so as to be inclined with respect to its base end portion as a fulcrum due to a pressing force caused by the fitting resistance. As a measure against it, a structure can be considered including a rib-shaped support portion formed at the peripheral edge portion of the cover and the support portion positioned towards the terminal portion to prevent inclined deformation of the terminal portion.

One of the electric connection boxes is disclosed in Patent Document 1.

Patent Document 1: Japanese Patent Laid-Open No. 2003-164039

When the support portion, which is an inclination preventing means of the terminal portion, is formed on the cover as above, there is a concern that the cover might be displaced by the pressing force from the terminal portion side and as a result, becomes unable to regulate the inclined deformation of the terminal portion any more.

The present invention was made in view of the above circumstances and has an object to prevent deformation of the terminal portion of the bus bar.

DISCLOSURE OF THE INVENTION

The present invention comprises a circuit constituent accommodated in a case, in which the circuit constituent comprises a circuit board on which a switching member is implemented and a bus bar wired along the circuit board, the case is provided with a frame substantially in the rectangular frame state arranged on the circuit board and fixed along its peripheral edge and a cover assembled to the frame so as to block an opening on the front surface side and covering the circuit board, at an end projecting from the outer circumferential edge of the circuit board in the bus bar, a support portion in the bent shape substantially in the L shape and rising from the bus bar to the front surface side at a right angle with respect to the circuit board and a terminal portion constructed by a connection portion extending from a rising end of the support portion substantially at a right angle are provided in plural side by side along the frame, and at an outer edge portion of the cover, a falling restricting portion is formed for restricting falling toward the circuit board side and deformation of the terminal portion by being brought into contact with the support portion, wherein displacement restricting portions capable of mutual locking are formed at outer edge portions of the frame and the cover and displacement of the falling restricting portion in the direction separated from the support portion of the terminal portion is restricted by locking between the displacement restricting portion on the frame side and the displacement restricting portion on the cover side.

According to the present invention, since displacement of the falling restricting portion in the direction separated from the support portion of the terminal portion is restricted by locking between the displacement restricting portions provided at the outer edge portions of the frame and the cover, deformation of the terminal portion toward the circuit board side can be prevented by this falling restricting portion.

DESCRIPTION OF SYMBOLS

Figure 1:
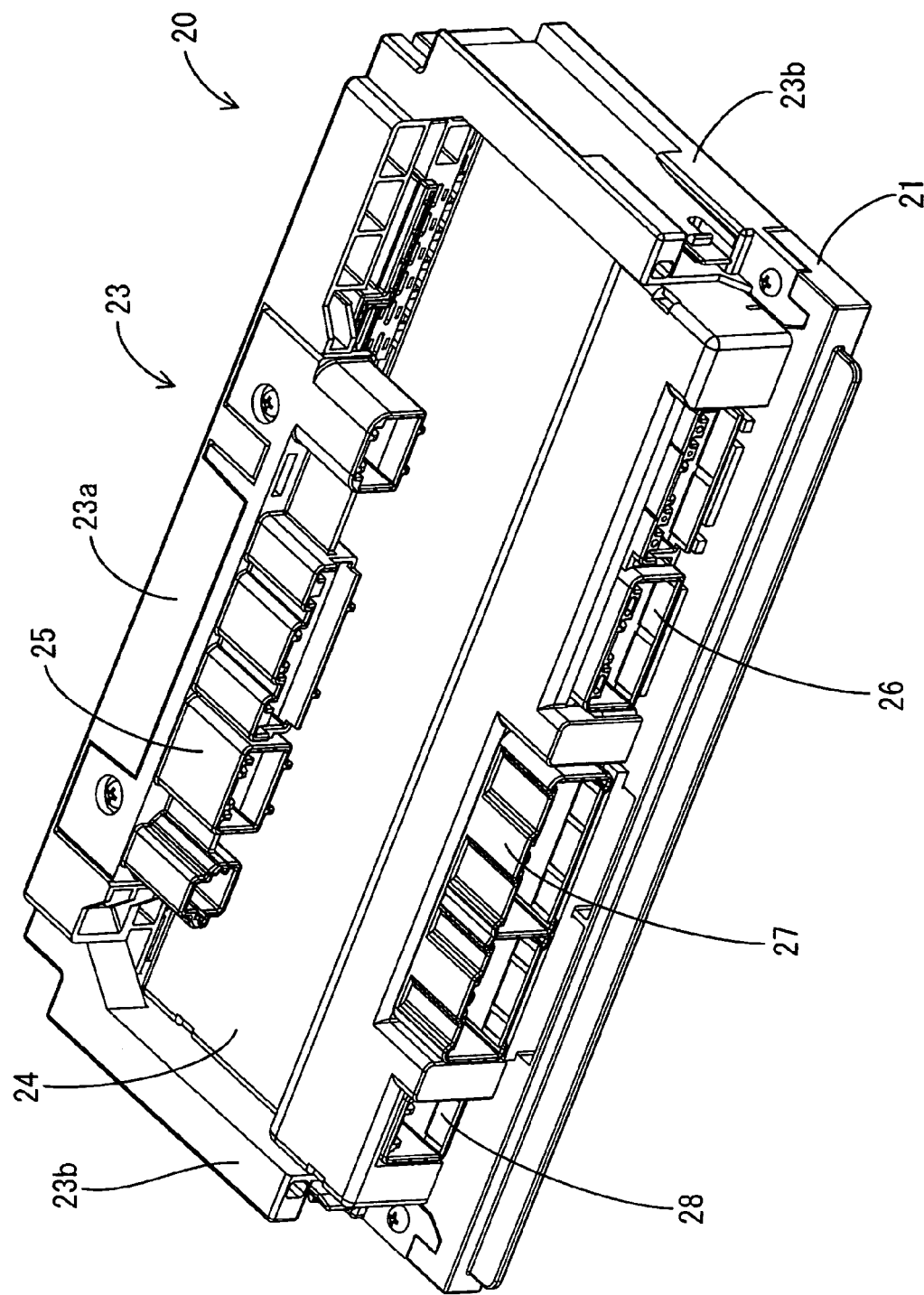
FIG. 1 is a perspective view showing an assembled state of an embodiment 1.
Figure 2:
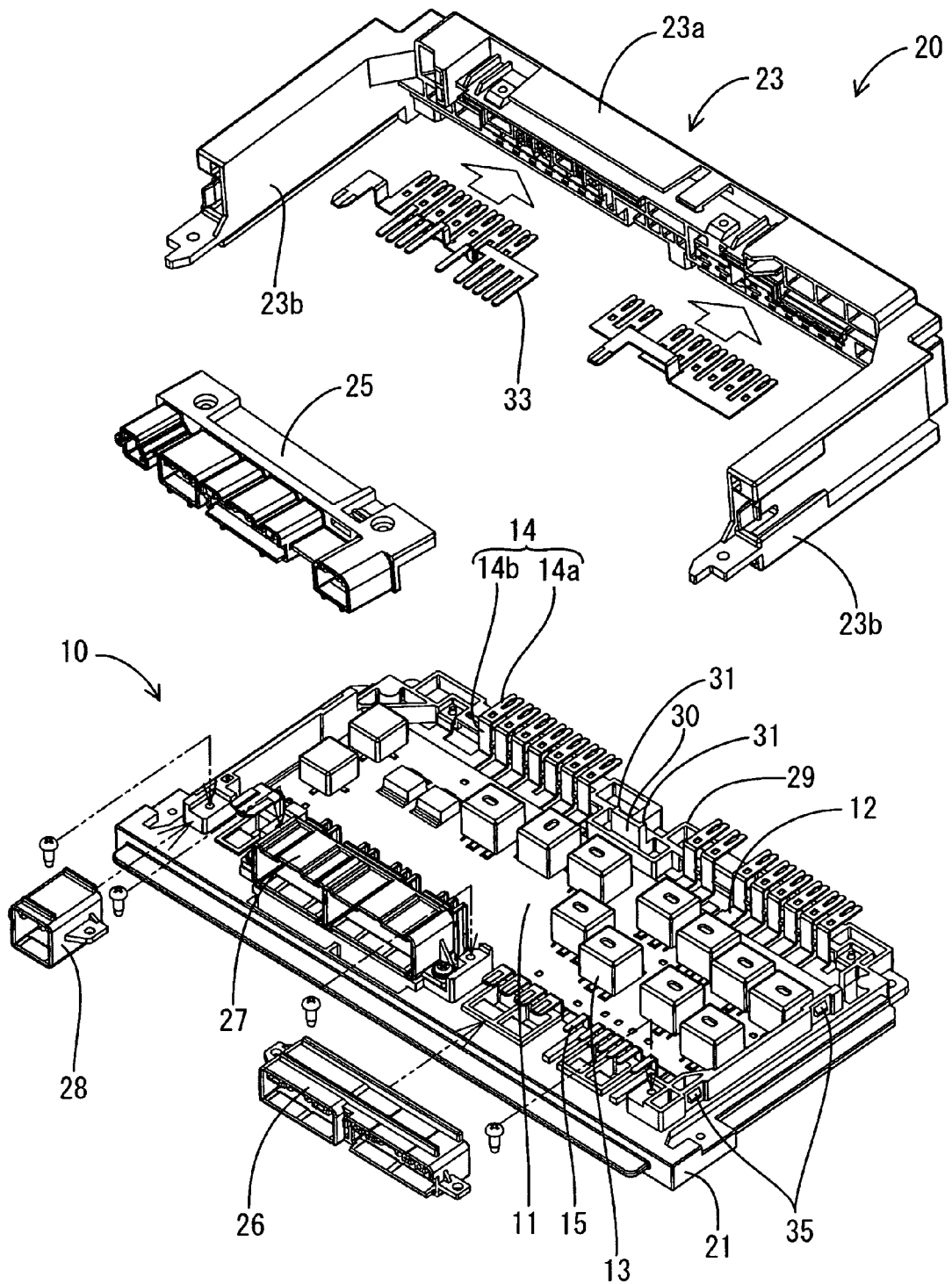
FIG. 2 is a perspective view showing a disassembled state.
Figure 3:
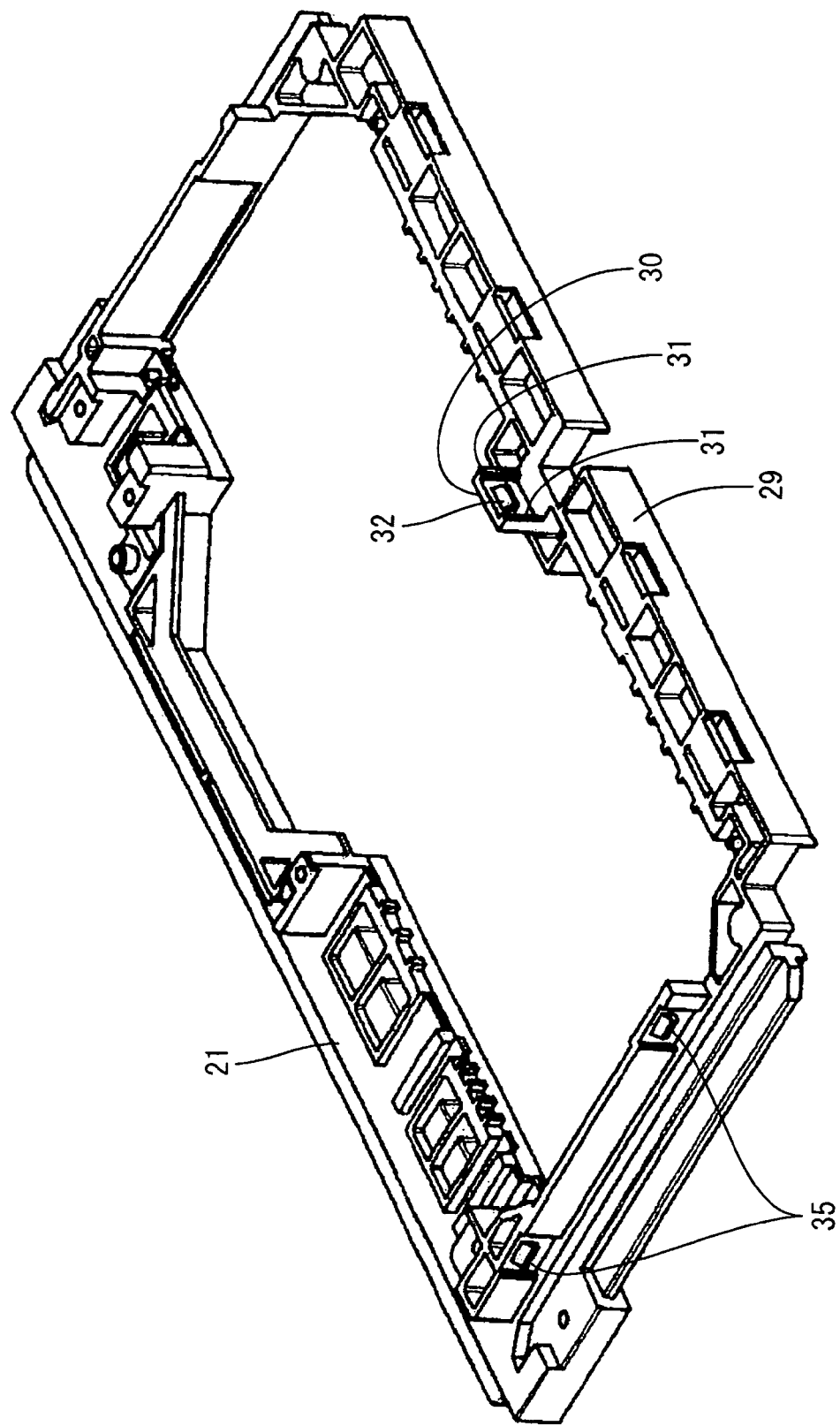
FIG. 3 is a perspective view of a frame.
Figure 4:
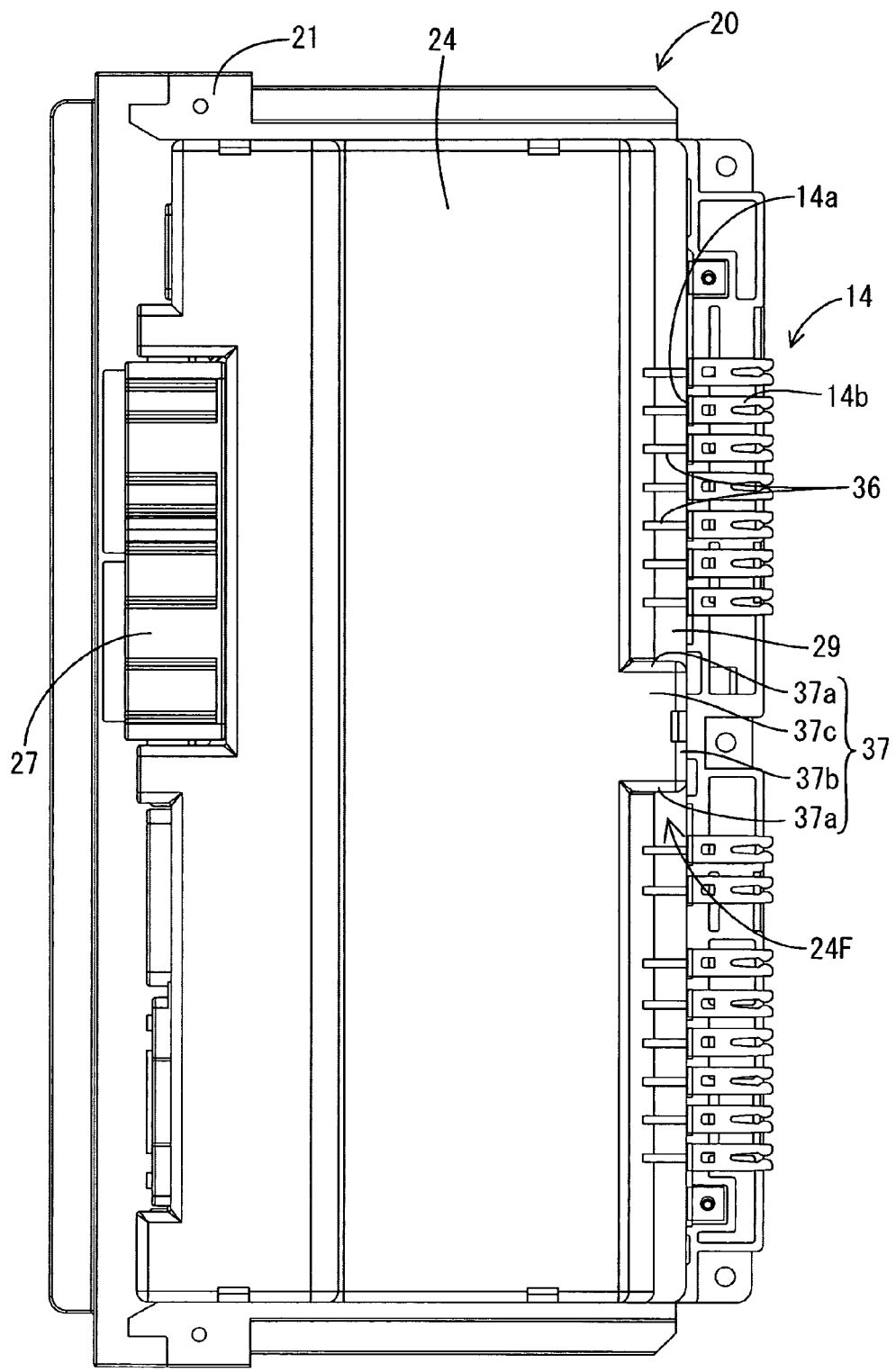
FIG. 4 is a plan view showing a state where a fuse block is removed.
Figure 5:
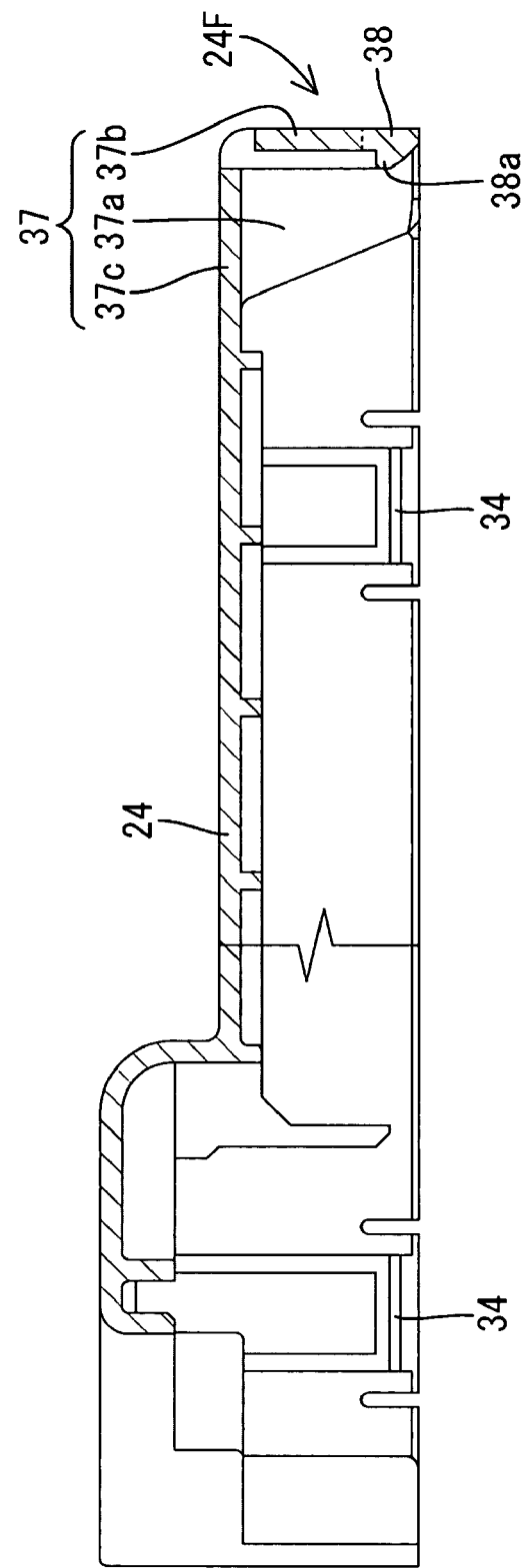
FIG. 5 is a sectional view of a cover.

10 . . . Circuit constituent
11 . . . Circuit board
12 . . . Bus bar
13 . . . Switching member
14 . . . First terminal portion (terminal portion)
14*a* . . . Support portion
14*b* . . . Connection portion
20 . . . Case
21 . . . Frame
24 . . . Cover
24F . . . Front edge portion (outer edge portion)
30 . . . Displacement restricting portion
32 . . . Lock projection (lock portion)
36 . . . Falling restricting portion
37 . . . Displacement restricting portion
38 . . . Lock piece (lock portion)

BEST MODE FOR CARRYING OUT THE INVENTION

Embodiment 1

A first embodiment embodying the present invention will be described below referring to FIGS. 1 to 8. An electric connection box of this embodiment is mounted on an automobile and interposed between a battery (not shown) and electric equipment such as a lamp and audio equipment (not shown) for distributing/supplying power supplied from the battery to electric equipment and for controlling switching of power supply or the like. In the figure, the electric connection box is depicted with the front surface side upward, but when it is mounted on an automobile, the electric connection box is accommodated in a relay box (not shown) with a fuse block 23 located on the upper side and housings 25, 26, 27, and 28 opened downward, and the relay box is fixed to a car body (not shown).

The electric connection box comprises a circuit constituent 10 and a case 20 accommodating the circuit constituent 10.

Figure 6:
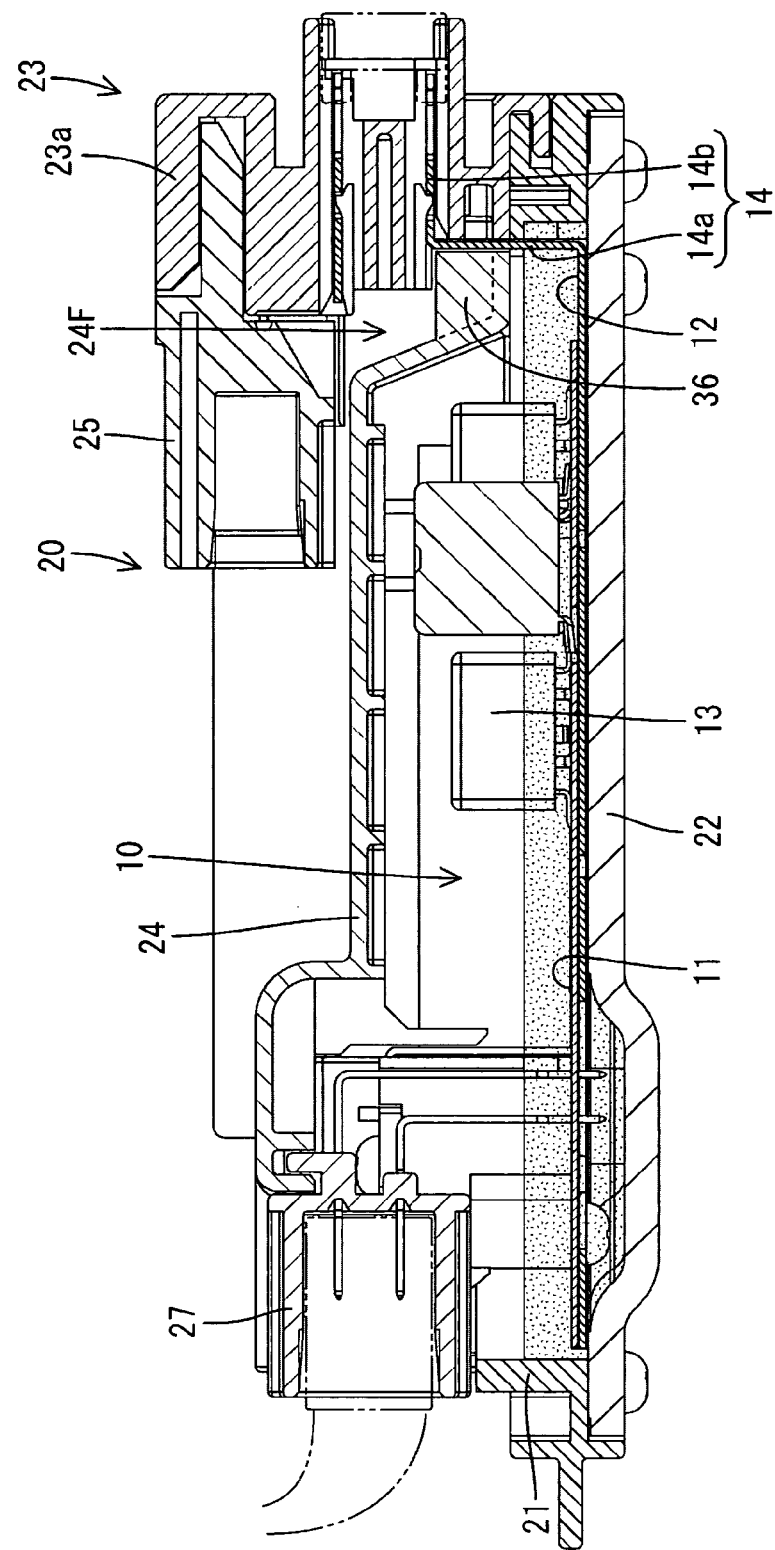
FIG. 6 is a sectional view.

The circuit constituent 10 comprises a circuit board 11, a plurality of bus bars 12 wired along the back surface of the circuit board 11 (lower face in FIG. 6) and a switching member 13 such as a relay implemented on the front surface side of the circuit board 11 (upper face side in FIG. 6). The bus bars 12 are bonded to the back face of the circuit board 11, and a first terminal portion 14 formed at the end of the bus bar 12 and is projected from the front end edge of the circuit board 11 and a second terminal portion 15 similarly formed at the end of the bus bar 12 is projected from the rear end edge of the circuit board 11.

The first terminal portion 14 comprises a support portion 14a rising to the front surface side (upward) substantially at a right angle with respect to the circuit board 11 and a connection portion 14b extending from a rising end of the support portion 14a to the front (opposite to the circuit board 11) substantially at a right angle (substantially in parallel with the circuit board 11) and forms substantially the L shape when seen from the side. On the other hand, the second terminal portion 15 is also bent substantially in the L shape when seen from the side as with the first terminal portion 14.

The case 20 is configured by comprising a frame 21 substantially in the rectangular frame state made of an insulating material such as a synthetic resin, a metal radiator plate 22 fixed to the frame 21 so as to block an opening on the back side, a fuse block 23 made of a synthetic resin and assembled to the frame 21 from its front end edge side, a cover 24 made of a synthetic resin and assembled to the frame 21 so as to block the opening on the front surface side (side opposite to the radiator plate 22), a first housing 25 made of a synthetic resin and assembled to the fuse block 23, and a second to a fourth housings 26, 27, 28 made of a synthetic resin and assembled at a rear edge portion of the frame 21. The radiator plate 22 is substantially in the similar shape to the circuit board 11, and the back face of the bus bar 12 is bonded to the surface of the radiator plate 22 by an adhesive (not shown).

The frame 21 is arranged so as to continuously surround the circuit constituent 10 over the entire periphery along the peripheral edge of the circuit board 11 and fixed to the surface of the radiator plate 22 by an adhesive (not shown). The above-mentioned plurality of first terminal portions 14 are arranged side by side laterally along a front edge portion 29 of the frame 21. The arrangement area of the first terminal portions 14 is an area in the front edge portion 29 of the frame 21 excluding the center part in the length direction, and at this front edge portion 29 of the frame 21, a plate-state displacement restricting portion 30 is formed rising to the front surface side substantially at a right angle with respect to the circuit board 11. The plate face of the displacement restricting portion 30 is parallel with the length direction of the front edge portion 29 of the frame 21 and the length direction of the support portion 14a of the first terminal portion 14. On the front face of the displacement restricting portion 30 (face to be the outside of the frame 21), a rib 31 extending in parallel with the rising direction of the displacement restricting portion 30 along its right-and-left both side edges and a lock projection 32 (corresponding to the lock portion,) projecting to the front from the intermediate position of both the ribs 31 are formed.

The fuse block 23 comprises a laterally long body portion 23a arranged along the front edge portion 29 of the frame 21 and a pair of arm portions 23b extending in a cantilever state from right-and-left both ends of the body portion 23a to the rear. In the body portion 23a, the connection portion 14b of the first terminal portion 14, substantially the front half region of a terminal fixture 33 and a fuse (not shown) for connecting the first terminal portion 14 and the terminal fixture 33 are accommodated.

The first housing 25 is assembled to the fuse block 23 from behind, and substantially the rear half region of the terminal fixture 33 is stored in the first housing 25. A fitting cylinder portion of the first housing 25 is opened rearward. The second to the fourth housings 26, 27, 28 have fitting cylinder portions opened rearward and fixed to the surface (front) of the rear edge portion of the frame 21 by a screw. To the fitting cylinder portions of the first to the fourth housings 25, 26, 27, 28, harness-side connectors (not shown) are fitted.

The cover 24 is generally similar in the shape to the circuit board 11 and slightly larger than the circuit board 11. The cover 24 is assembled to the frame 21 from the front surface side, and it is locked in the assembled state by locking deflection locking pieces 34 at right-and-left edge portions of the cover 24 by lock projections 35 at right-and-left both side edges of the frame 21. In the state where the cover 24 is assembled, the circuit board 11 and the switching member 13 stored in the frame 21 are covered by the cover 24.

At the cover 24, a plurality of falling restricting portions 36 are formed in parallel along a front edge portion 24F of the cover 24 (corresponding to the outer edge portion of the cover,)and corresponding to the plurality of first terminal portions 14. The falling restricting portion 36 is in the flat plate state perpendicular to the arrangement direction of the first terminal portions 14, and the front edge portion is brought into contact with the rear face of the support portion 14a of the first terminal portion 14 (the face opposite to the projecting direction of the connection portion 14b) from behind. Therefore, even if a rearward pressing force acts on the connection portion 14b of the first terminal portion 14 from another member (a terminal of the harness-side connector, for example), the support portion 14a of the first terminal portion 14 is supported from behind by the falling restricting portion 36 and it is not deformed to fall rearward (the side opposite to the connection portion 14b).

Moreover, at the center position in the width direction of the front edge portion 24F of the cover 24 (corresponding to the outer edge portion of the cover), a displacement restricting portion 37 is formed as means to improve reliability of the falling restricting function of the first terminal portion 14. The displacement restricting portion 37 comprises a right and left pair of support wall portions 37a projecting forward in the plate state, a locking wall portion 37b connecting front end edges (projecting end edges) of the support wall portions 37a to each other, and a reinforcing plate 37c in parallel with the circuit board 11 and connecting the upper end edges of the pair of support wall portions 37a and the upper end edge of the locking wall portion 37b, and it is formed in the bent shape substantially in the box state opened downward and rearward (inside of the cover 24) as a whole. The pair of support wall portions 37a are extended rearward from the both side edges of the locking wall portion 37b substantially at a right angle. At the center part in the width direction of the locking wall portion 37b, a lock piece 38 capable of elastic deflection (corresponding to the lock portion) is formed, and a projection-state lock claw 38a is formed on the rear face of the lock piece 38 (inner face).

Figure 7:
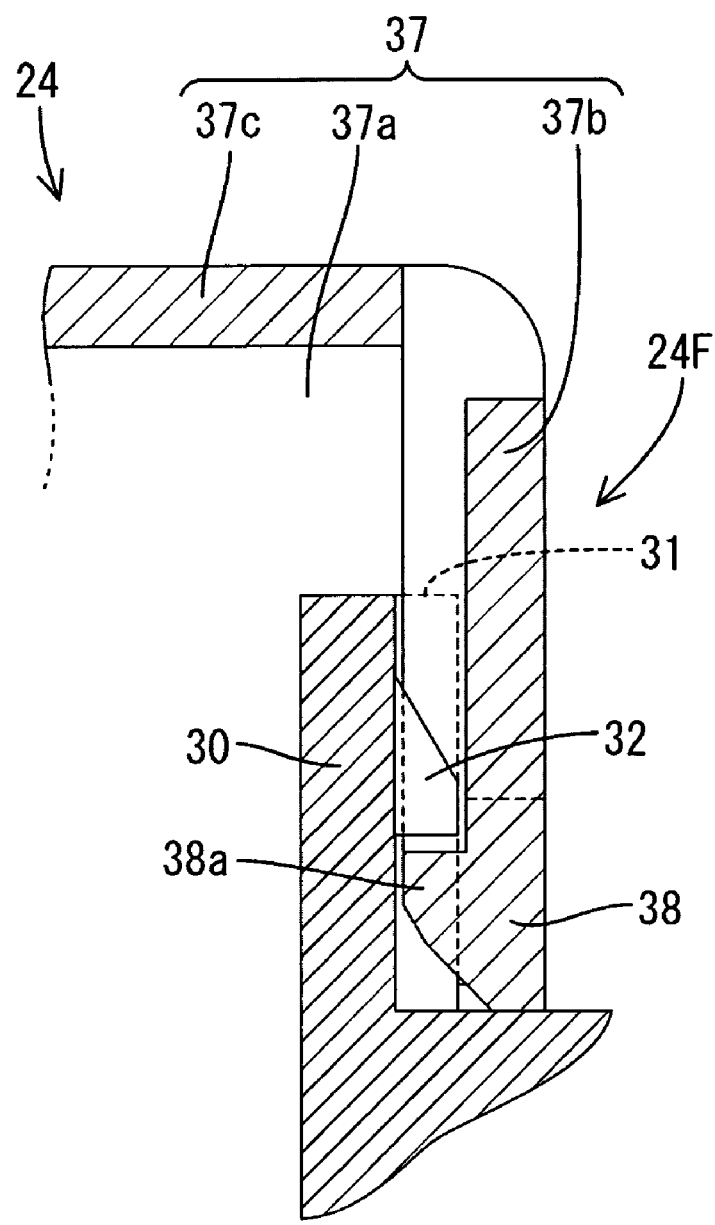
FIG. 7 is a partially enlarged sectional view showing a lock structure between a lock projection of the frame and a lock piece of the cover.
Figure 8:
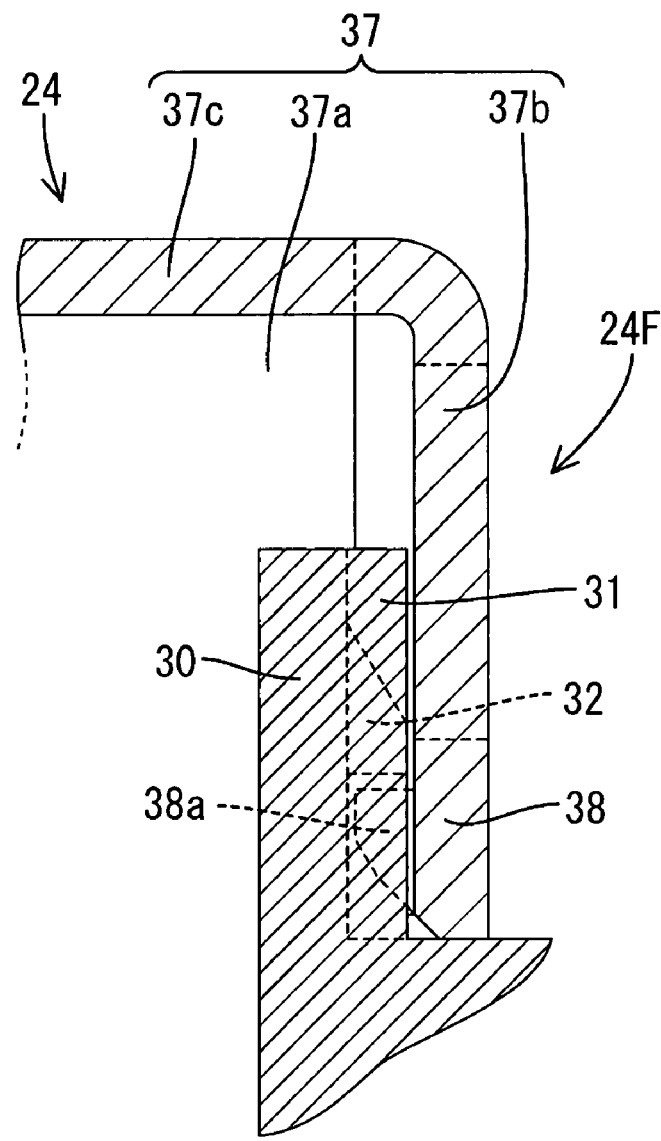
FIG. 8 is a partially enlarged sectional view showing a locking state between a displacement restricting portion of the frame and the displacement restricting portion of the cover.

When the cover 24 is assembled to the frame 21, as shown in FIG. 7, the lock claw 38a of the lock piece 38 is locked by the lock projection 32, and displacement to the front surface side (side separated from the circuit board 11) of the cover 24 is restricted with respect to the frame 21 and thus, locked in the assembled state. As shown in FIG. 8, since an area above the lock piece 38 in the locking wall portion 37b of the cover 24 is locked from the front (the right side in FIG. 8) against the upper end of the right and left pair of ribs 31 of the frame 21, and relatively rearward (that is, in the direction separated from the first terminal portion 14) displacement of the front edge portion 24F of the cover 24 is restricted with respect to the front edge portion 29 of the frame 21. In other words, rearward separation of the falling restricting portion 36 with respect to the support portion 14a is prevented. By this, the falling restricting portion 36 of the cover 24 can restrict falling deformation of the first terminal portion 14 toward the circuit board 11 side.

Also, since the displacement restricting portion 37 on the cover 24 side is in the bent shape substantially in the box state, strength of the displacement restricting portion 37 is higher than a single-plate displacement restricting portion so that displacement of the cover 24 with respect to the frame 21 can be restricted more reliably.

Also, since the lock piece 38 and the lock projection 32 for locking the cover 24 and the frame 21 in the assembled state are provided at the displacement restricting portions 30, 37, arrangement space exclusively for a locking portion is not needed at a position other than the displacement restricting portions 30, 37, and the saving of space is realized.

Another Embodiment

The present invention is not limited to the above embodiment described based on the description and the attached drawings but the following embodiments, for example, are also included in the technical scope of the present invention.

(1) The falling restricting portion is individually provided at each terminal portion in the above embodiment, but according to the present invention, the falling restricting portion may be in the form continuing in the arrangement direction of the terminal portions;

(2) The displacement restricting portion is in the bent shape substantially in the box state in the above embodiment, but according to the present invention, the displacement restricting portion may be a single-plate state; and (3) The locking portion is provided at the displacement restricting portion in the above embodiment, but according to the present invention, the locking portion may be provided at a position different from the displacement restricting portion.

The invention claimed is:

1. An electric connection box, comprising:
a circuit constituent accommodated in a case;
the circuit constituent comprising a circuit board on which a switching member is implemented and a bus bar wired along the circuit board;
the case having a substantially rectangular frame arranged on the circuit board and fixed along a peripheral edge thereof and a cover assembled to the frame so as to block an opening on a front surface side and covering the circuit board;
a terminal portion positioned at an end projecting from an outer circumferential edge of the circuit board, the terminal portion generally having an L shape and rising from the bus bar to the front surface side at a right angle with respect to the circuit board, the terminal portion including a support portion and a connection portion, the support portion extending substantially perpendicular from the bus bar and the connection portion extending substantially perpendicular from the support portion, the support portion being provided in plural side by side along the frame; and
a falling restricting portion positioned at an outer edge portion of the cover, the falling restricting portion constructed to restrict falling toward a circuit board side and constructed to restrict deformation of the terminal portion by being brought into contact with the support portion,
wherein displacement restricting portions are positioned at the outer edge portions of the frame and the cover; and
displacement of the falling restricting portion in the direction separated from the support portion of the terminal portion is restricted by interaction between the displacement restricting portion on the frame side and the displacement restricting portion on the cover side.

2. The electric connection box according to claim 1, wherein the displacement restricting portion on the cover side is in a bent shape when interacting with the box.

3. The electric connection box according to claim 1, wherein at the displacement restriction portion on the frame side and the displacement restricting portion on the cover side, locking portions capable of locking the cover and the frame in the assembled state by mutual locking are provided.

4. An electric connection box, comprising:
a circuit positioned in a case, the circuit including a circuit board;
a switching member connected to the circuit board;
a bus bar connected to the circuit board;
a cover connected to the frame, the cover capable of covering the circuit board;
a terminal portion positioned at an end bus bar, the terminal portion generally having an L shape and including a support portion and a connection portion, wherein the support portion extends in a first direction away from the bus bar and the connection portion extends in a second direction away from the support portion, further wherein the support portion is provided in plural;
a falling restricting portion positioned at an edge of the cover, the falling restricting portion constructed to restrict falling toward a circuit board side and constructed to restrict deformation of the terminal portion by being brought into contact with the support portion; and
displacement restricting positioned at the edge of the frame and the cover;
wherein displacement of the falling restricting portion in the direction away from the support portion of the terminal portion is restricted by mutual interaction.

5. The electric connection box according to claim 4, wherein the displacement restricting portion on the cover side is in a bent shape when interacting with the box.

6. The electric connection box according to claim 4, wherein at the displacement restriction portion on the frame side and the displacement restricting portion on the cover side, locking portions capable of locking the cover and the frame in the assembled state by mutual locking are provided.

7. An electric connection box, comprising:
a circuit positioned in a case, the circuit including a circuit board;
a switching member connected to the circuit board;
a bus bar connected to the circuit board;
a cover connected to the frame, the cover capable of covering the circuit board;
a terminal portion positioned at an end bus bar, the terminal portion including a support portion and a connection portion, wherein the support portion extends in a first direction away from the bus bar and the connection portion extends in a second direction parallel to the bus bar;

a falling restricting portion positioned at an edge of the cover, the falling restricting portion constructed to restrict falling toward a circuit board side and constructed to restrict deformation of the terminal portion by being brought into contact with the support portion; and displacement restricting portions positioned at the edge of the frame and the cover; wherein displacement of the falling restricting portion in the direction away from the support portion of the terminal portion is restricted by mutual interaction.

8. The electric connection box according to claim 7, wherein the displacement restricting portion on the cover side is in a bent shape when interacting with the box.

9. The electric connection box according to claim 8, wherein at the displacement restriction portion on the frame side and the displacement restriction portion on the cover side, locking portions capable of locking the cover and the frame in the assembled state by mutual locking are provided.

10. The electric connection box according to claim 7, wherein the support portion is provided in plural.

11. The electric connection box according to claim 8, wherein the support portion is substantially perpendicular to the bus bar and the connection portion.

12. The electric connection box according to claim 8, wherein the terminal portion is generally L shaped.

13. The electric connection box according to claim 8, wherein the terminal portion is positioned at an outer circumferential edge of the circuit board.

* * * * *